July 6, 1926.
C. SCHENCK
1,591,106
SPACER FOR METALLIC WHEELS
Filed May 6, 1922
2 Sheets-Sheet 1
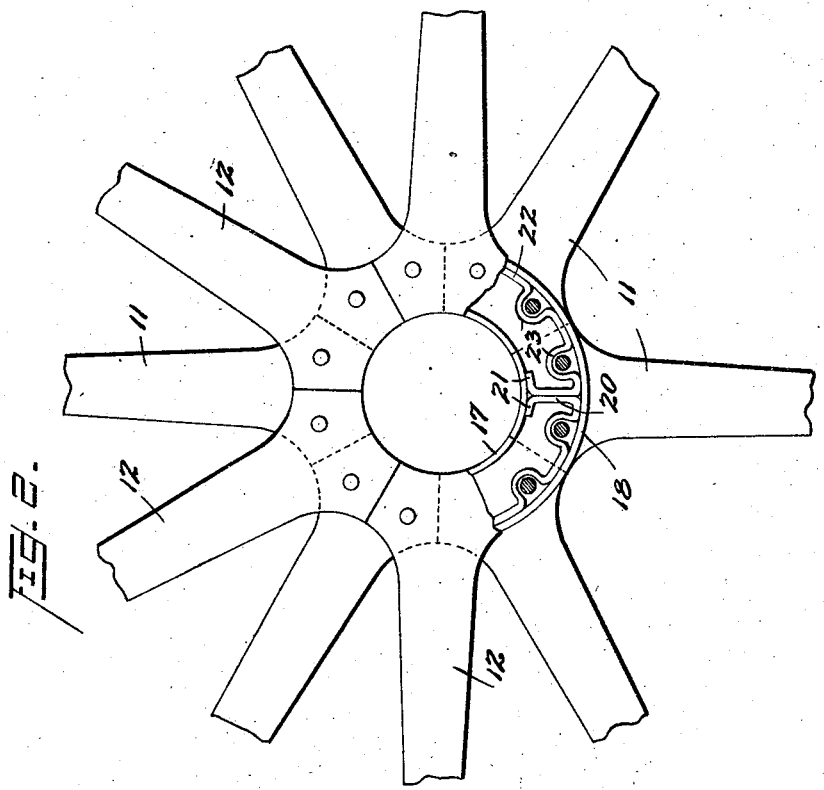
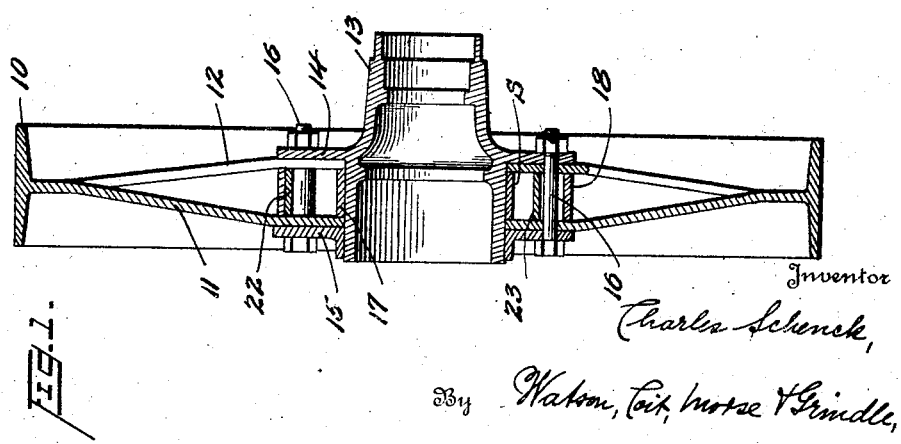
Inventor
Charles Schenck,
By Watson, Coit, Morse & Grindle,
Attorneys.

July 6, 1926.  
C. SCHENCK  
1,591,106  
SPACER FOR METALLIC WHEELS  
Filed May 6, 1922  
2 Sheets-Sheet 2
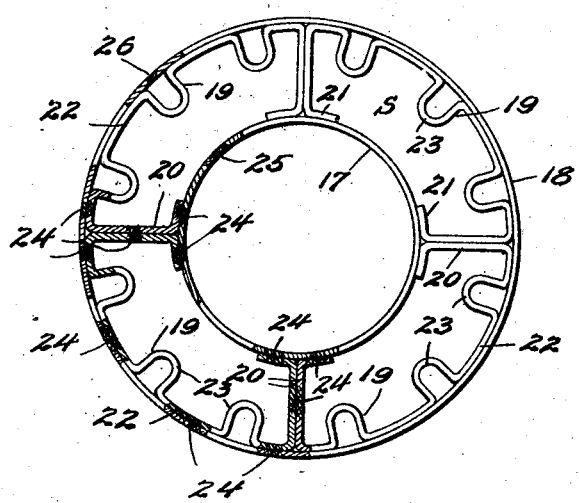
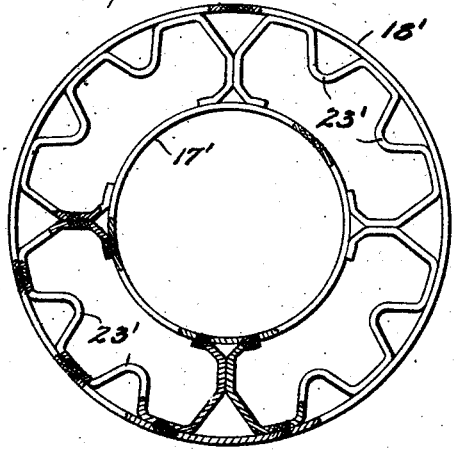 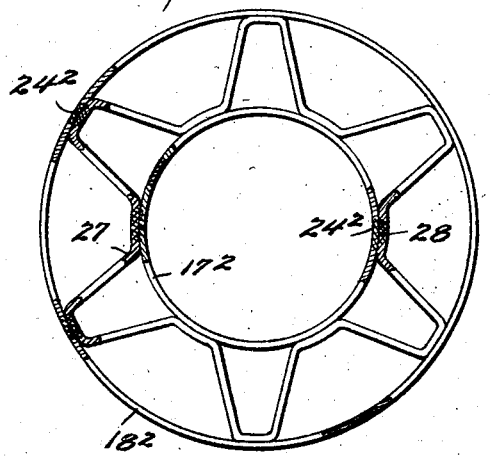
Inventor  
Charles Schenck,  
By Watson, Coit, Morse & Grindle,  
Attorneys.

Patented July 6, 1926.

1,591,106

UNITED STATES PATENT OFFICE.

CHARLES SCHENCK, OF BETHLEHEM, PENNSYLVANIA, ASSIGNOR TO BETHLEHEM STEEL COMPANY, OF BETHLEHEM, PENNSYLVANIA, A CORPORATION OF PENNSYLVANIA.

SPACER FOR METALLIC WHEELS.

Application filed May 6, 1922. Serial No. 558,964.

This invention relates to wheels, and particularly to metallic spoked vehicle wheels of the type disclosed in Patent No. 1,338,936 granted to Maurice Lachman, May 4, 1920. The wheel described in that patent is made from a unitary rolled bar of T section and has its spokes formed from the web of the bar and integral with the felloe or rim, the alternate spokes being bent in opposite directions axially of the wheel so that two sets of spokes are provided, the adjacent spokes of each set being in contact only at their inner ends. Around the hub and between the inner ends of the two sets of spokes is a spacer maintaining the spoke ends in spaced relation and a plurality of bolts arranged parallel to the axis of the wheel connect the spoke ends and hold them rigidly against the spacer.

The purpose of the present invention is to provide a spoke end spacer for a wheel of this type which is of novel form and construction, being light in weight while at the same time amply strong for the purpose intended, and which may be conveniently made from metallic strips of uniform cross section by simple bending and welding operations so that the cost of fabrication is reduced to a minimum.

The invention may be embodied in various forms and in the accompanying drawings several such forms are illustrated.

Fig. 1 is an axial section through a metallic wheel of the type above briefly described and showing the improved spacing member positioned thereon;

Fig. 2 is a side elevation of the center portion of the wheel, partly broken away, with hub removed;

Fig. 3 is an enlarged side elevation, partly broken away, of one form of spacer;

Fig. 4 is a similar view of a modified form; and

Fig. 5 is a similar view of a second modification.

The wheel illustrated, and in combination with which the present spacer is particularly useful, comprises a flat rim or felloe 10, a plurality of spokes 11 inclined in one direction relatively to the axis of the wheel and an equal number of spokes 12 alternating therewith and inclined in the opposite direction, the inner end of each spoke being enlarged and having radial edges which are in contact with the edges of the adjacent spokes.

The hub of the wheel has the usual tubular portion 13 and is provided with an integral annular flange 14 against which the outer faces of the inner ends of spokes 12 abut. The inner end edges of the spokes of each set are arc-shaped, as shown in Figure 2, and fit closely against the cylindrical outer surface of the hub. An annular flanged member 15 formed separately from the hub is adapted to abut against the outer faces of the inner ends of spokes 11 and a plurality of bolts 16 extend through flange 14, member 15, and the inner ends of the spokes to rigidly secure these parts together, a spacer S being provided to maintain the inner ends of the spokes in fixed spaced relation. It will be seen from Figure 2 that the bolts are so arranged that the inner end of each spoke of one set is connected to the inner ends of two adjacent spokes of the opposite set.

The form of spacer illustrated in Figures 1, 2 and 3 comprises essentially an inner ring member 17 of such diameter as to fit closely around the cylindrical portion of hub 13, an outer ring 18, and four strips or members 19 which are substantially quarter sectors and which together constitute a filler which fits in the annular space between the two rings for holding the latter in fixed spaced relation. Each of these members 19 has two radial portions 20 provided with feet 21 which bear on the inner ring 17, and has a curved portion 22 which fits closely against the inner surface of the outer ring 18, this portion 22 having three inwardly extending loops 23 which are adapted to receive and constitute sleeves for the transversely extending bolts 16. The rings 17 and 18 and sectors 19 may all be formed of metallic strips of uniform cross section bent into the shapes illustrated and rigidly secured together, preferably by welding at the points marked 24. The ends of the strip from which the inner ring 17 is formed are welded together at 25 and the ends of the outer ring 18 are welded together at 26.

The modification illustrated in Figure 4 differs from the form illustrated in Figures 1, 2 and 3 in the specific form of the intermediate sectors, while the modification illustrated in Figure 5 differs from the other forms illustrated by having a continuous intermediate member 27 which has alternate points of contact with the inner ring $17^2$ and the outer ring $18^2$. The ends of this star-shaped intermediate member are welded together at 28 and this member is welded to the inner and outer rings at each point of contact therewith as at points $24^2$. In Figure 4 the bolts 16 are adapted to pass through the loops 23' and in Figure 5 through the space between the outwardly converging portions of members 27.

The spacer, when applied to the wheel, not only serves to keep the inner ends of the spokes in spaced relation but also to transmit the stresses imposed upon any one spoke to the adjacent spokes, so that the strains are distributed. The side edges of the rings and strips being in parallel planes, and the surfaces of these members being at right angles to these planes, a maximum axial strength is provided for a given weight of metal. To one skilled in the art the advantages of the invention will be apparent and it will also be clear that still other modifications may be designed and constructed within its scope and spirit.

Having thus described the invention what is claimed as new and desired to be secured by Letters Patent is:

1. A spacer of the class described, comprising in combination, inner and outer rings concentrically arranged, and spacing structure fitting in the annular space between the rings and consisting of bent metallic strip material having portions welded to the outer surface of the inner ring and to the inner surface of the outer ring and other portions extending between the rings and joined to portions welded respectively to the inner and to the outer rings.

2. A spacer of the class described, comprising in combination, inner and outer rings concentrically arranged, and four similar substantially sector shaped members lying between said rings and secured thereto to form an annular filler.

3. A spacer of the class described, comprising in combination, inner and outer rings concentrically arranged, and four similar substantially sector shaped members lying between said rings and secured thereto and to one another to form a unitary annular filler and ring structure, each member being looped to provide a sleeve to receive a bolt passing axially of the same.

4. In a wheel, a spacer construction for a pair of spaced rows of inner spoke ends comprising concentric rings and spacing means between the rings including strips each of which has a plurality of portions secured to the inner ring, a plurality of portions secured to the outer ring, a plurality of spacing portions extending transversely between the rings, and a plurality of loop portions between the portions secured to the outer ring, the loop portions defining with the outer ring bolt openings.

5. In a wheel, a spacer construction for spacing a pair of rows of inner spoke ends comprising concentric metallic rings and metallic strip means having portions extending transversely between the rings and portions welded to the outer periphery of the inner ring and to the inner periphery of the outer ring.

6. In a wheel, a spacer construction for a pair of rows of inner spoke ends comprising inner and outer metallic rings and a plurality of metallic strips each of which is provided with portions secured to the outer periphery of the inner ring and to the inner periphery of the outer ring, with inwardly-extending loops between the portions secured to the inner periphery of the outer ring and with terminal transverse spacing portions between the rings, the abutting transverse portions of adjacent strips being secured together.

7. In a wheel, a spacer construction for a pair of spaced rows of inner spoke ends comprising an inner ring curved from a strip of metal and having the abutting ends welded together, an outer ring curved from a strip of metal and having the abutting ends welded together and spacing means between the rings including a plurality of strips of metal each of which is provided with portions welded to the outer periphery of the inner ring and to the inner periphery of the outer ring, with inwardly-extending loops between the portions welded to the outer ring and with terminal transverse portions extending between the inner and the outer rings, the abutting transverse portions of adjacent strips being welded together.

In testimony whereof I hereunto affix my signature.

CHARLES SCHENCK.